(12) United States Patent
Edvardsson

(10) Patent No.: US 10,403,953 B2
(45) Date of Patent: Sep. 3, 2019

(54) TANK WITH A GUIDED WAVE RADAR LEVEL GAUGE

(71) Applicant: Rosemount Tank Radar AB, Mölnlycke (SE)

(72) Inventor: Olov Edvardsson, Linköping (SE)

(73) Assignee: ROSEMOUNT TANK RADAR AB, Molnlycke (SE)

( * ) Notice: Subject to any disclaimer, the term of this patent is extended or adjusted under 35 U.S.C. 154(b) by 301 days.

(21) Appl. No.: 15/388,263

(22) Filed: Dec. 22, 2016

(65) Prior Publication Data
US 2018/0183126 A1    Jun. 28, 2018

(51) Int. Cl.
| | |
|---|---|
| *H01P 3/10* | (2006.01) |
| *G01F 23/284* | (2006.01) |
| *H01Q 1/22* | (2006.01) |
| *H01Q 11/02* | (2006.01) |
| *G01S 7/03* | (2006.01) |
| *G01S 13/88* | (2006.01) |

(52) U.S. Cl.
CPC ............. *H01P 3/10* (2013.01); *G01F 23/284* (2013.01); *G01S 7/03* (2013.01); *H01Q 1/225* (2013.01); *H01Q 11/02* (2013.01); *G01S 13/88* (2013.01)

(58) Field of Classification Search
CPC .......... H01P 3/10; G01F 23/284; H01Q 1/225
See application file for complete search history.

(56) References Cited

U.S. PATENT DOCUMENTS

| | | | | |
|---|---|---|---|---|
| 3,703,829 A * | 11/1972 | Dougherty | ........... | B64D 37/005 |
| | | | | 73/290 R |
| 6,386,055 B1 * | 5/2002 | Eason | .................... | G01F 23/284 |
| | | | | 324/642 |
| 6,847,214 B2 | 1/2005 | Reimelt et al. | | |
| 6,856,142 B2 * | 2/2005 | Schroth | ................. | G01F 23/284 |
| | | | | 324/644 |
| 7,636,059 B1 * | 12/2009 | Edvardsson | .......... | G01F 23/284 |
| | | | | 342/124 |
| 8,018,373 B2 * | 9/2011 | Edvardsson | .......... | G01F 23/284 |
| | | | | 342/118 |
| 8,823,397 B2 * | 9/2014 | Edvardsson | .......... | G01F 23/284 |
| | | | | 324/664 |
| 9,069,056 B2 * | 6/2015 | Janitch | .................. | G01S 7/4017 |
| 9,322,699 B2 * | 4/2016 | Korsbo | ................. | G01F 23/284 |
| 9,360,361 B2 * | 6/2016 | Flasza | .................... | G01F 23/284 |
| 9,383,246 B2 * | 7/2016 | Hagglund | ................. | H01Q 1/50 |
| 9,518,857 B2 * | 12/2016 | Edvardsson | ........... | H01Q 1/225 |
| 9,546,895 B2 * | 1/2017 | Flasza | .................... | G01F 23/284 |
| 9,574,929 B2 * | 2/2017 | Cobianu | ................ | G01F 23/284 |
| 9,612,147 B2 * | 4/2017 | Frovik | .................... | G01F 23/284 |
| 9,638,567 B2 * | 5/2017 | Fredriksson | ............. | G01S 7/02 |

(Continued)

*Primary Examiner* — Peter M Bythrow
(74) *Attorney, Agent, or Firm* — Westman, Champlin & Koehler, P.A.

(57) ABSTRACT

A tank arrangement including a guided wave radar level gauge installed in a tank, and having a single wire transmission line probe extending through a passage through a conducting structure in the tank. Along the section of the probe that extends through the passage, the arrangement comprises a propagation field limiting structure adapted to reduce a propagation field of an electromagnetic signal propagating along the probe. With this design, the radial extension of the propagating field can be locally reduced so that a sufficient portion of the signal power is allowed to pass through the passage.

21 Claims, 6 Drawing Sheets

(56) References Cited

U.S. PATENT DOCUMENTS

| | | | | |
|---|---|---|---|---|
| 9,778,089 B2* | 10/2017 | Edvardsson | .......... | G01F 23/284 |
| 9,970,806 B2* | 5/2018 | Eriksson | ................ | G01F 23/284 |
| 2009/0273506 A1* | 11/2009 | Delin | .................... | G01F 23/284 |
| | | | | 342/124 |
| 2009/0303106 A1* | 12/2009 | Edvardsson | .......... | G01F 23/284 |
| | | | | 342/124 |
| 2012/0319891 A1* | 12/2012 | Edvardsson | .......... | G01F 23/284 |
| | | | | 342/124 |
| 2013/0207835 A1* | 8/2013 | Deilmann | ................ | G01S 13/08 |
| | | | | 342/124 |
| 2015/0009063 A1* | 1/2015 | Korsbo | ................ | G01F 23/284 |
| | | | | 342/124 |
| 2015/0168201 A1* | 6/2015 | Cobianu | ............... | G01F 23/284 |
| | | | | 342/124 |

* cited by examiner

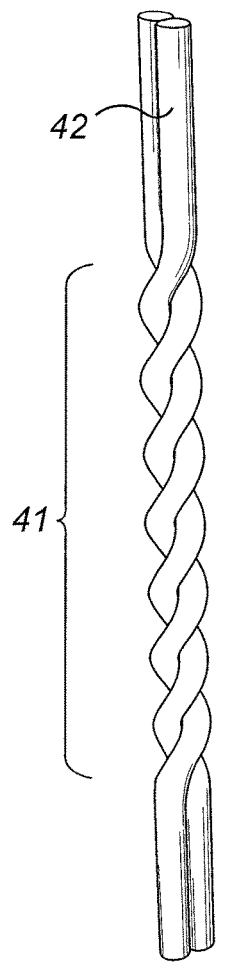 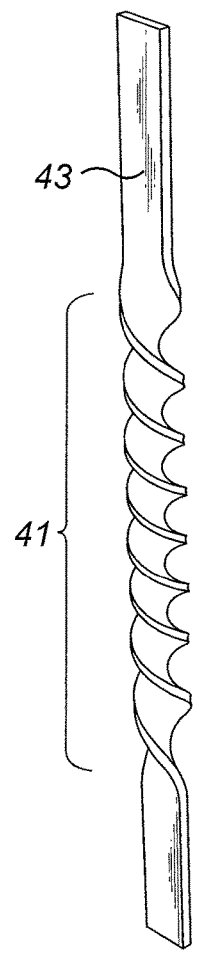 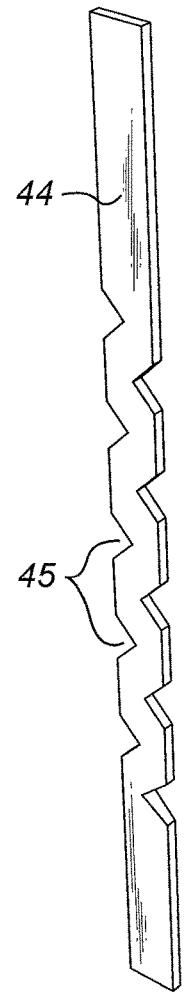
*Fig. 6a*  *Fig. 6b*  *Fig. 6c*

US 10,403,953 B2

TANK WITH A GUIDED WAVE RADAR LEVEL GAUGE

FIELD OF THE INVENTION

The present invention relates to a tank arrangement including a guided wave radar level gauge.

BACKGROUND OF THE INVENTION

Radar level gauge systems are in wide use for measuring process variables of products contained in tanks, such as filling level, temperature, pressure etc. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product along a transmission line probe. The transmission line probe is generally arranged vertically from top to bottom of the tank. The electromagnetic signals are subsequently reflected at the surface of the product, and the reflected signals are received by a receiver or transceiver comprised in the radar level gauge system. Based on the transmitted and reflected signals, the distance to the surface of the product can be determined.

The performance of RLGs, and in particular non-contact RLGs, may be negatively affected by electrically conducting elements or structures in the tank, potentially interfering with the level detection making it less reliable. Such interference can be reduced or avoided by providing some kind of wave guiding structure extending into the tank, thereby ensuring that the emitted and reflected signals have a restricted propagation patterns. Guided wave RLG is typically less affected by interference from structures in the tank, as the signals are more or less restricted to the probe. However, in the case of a single wire transmission line probe (i.e. a transmission line probe with only one single conductor), the propagation field of the signals will have a radial extension within a certain radius around the probe.

In some applications, the tank may be provided with electrically conducting structures (e.g. intermediate decks) having a narrow passage (e.g. having a diameter of 1 m or less) in the operating range of the RLG that the probe needs to pass through. One example of such a structure is an intermediate deck, providing manual access to the tank when it is not in use. Another example is structures providing mechanical strength to the tank. If this passage is more narrow than the radial extension of the propagation field, the power of the signal will be reduced. A power loss of around 5% is typically sufficient to significantly reduce the performance of the GWR.

Conventionally, when a tank exhibits passages that are more narrow that the propagation field of a single wire transmission probe, the probe is coated, e.g. with PTFE, to significantly reduce the radial extension of the propagation field. However, a drawback with this solution is a more expensive probe and also an increase in resistive losses leading to a weaker echo from the surface.

General Disclosure of the Invention

It is an object of the present invention to provide an improved solution for single wire transmission line probes passing through a passage in an electrically conducting structure in a tank.

According to a first aspect of the invention, this object is achieved by a tank arrangement including a tank having a tank roof and a passage surrounded by an electrically conducting structure, the passage being located at a level below the tank roof and having a passage cross section which is smaller than a tank cross section at the level, and a guided wave radar level gauge installed in the tank for determination of a filling level of a product contained in the tank. The guided wave radar level gauge includes transceiver circuitry for generating and transmitting an electromagnetic transmit signal in an operating frequency range, and receiving an electromagnetic return signal, a single wire transmission line probe connected to the transceiver circuitry and extending into the tank through a tank entry and configured to guide the electromagnetic transmit signal from the transceiver circuitry to a surface of the product and to return an electromagnetic return signal resulting from reflection of the electromagnetic transmit signal by the surface, processing circuitry connected to the transceiver and configured to determine the filling level based on a relationship between the transmit signal and the return signal. The single wire transmission line probe includes a first section connected to the tank entry and extending a distance from the tank entry to a point located above the passage, a second section located completely below the passage, and a third section connecting the first and second sections with each other and extending through the passage, wherein a propagation field of an electromagnetic signal in the operating frequency range propagating along the first and second section has a first radial extension. The arrangement further includes a propagation field limiting structure arranged along the third section of the transmission line probe, the propagation field limiting structure being adapted to cause a propagation field of an electromagnetic signal in the operating frequency range propagating along the third section of the probe to have a second radial extension, wherein the second radial extension is smaller than the first radial extension.

According to a second aspect of the invention, this object is achieved by a method for determination of a filling level of a product contained in the tank, the tank including a tank roof and a passage surrounded by an electrically conducting structure, the passage being located at a level below the tank roof and having a passage cross section which is smaller than a tank cross section at the level, the method comprising generating and transmitting an electromagnetic transmit signal in an operating frequency range, guiding the transmit signal along an upper section of a single wire transmission line probe, the first section being connected to a tank entry and extending a distance from the tank entry to a point located above the passage, a propagation field of the transmit signal along the upper section having a first radial extension, guiding the transmit signal along an intermediate section of the single wire transmission line probe, the intermediate section extending through the passage, reducing the propagation velocity along the intermediate section, such that a propagation field of the transmit signal along the intermediate section has a second radial extension, wherein the second radial extension is smaller than the first radial extension, guiding the transmit signal along a lower section of the single wire transmission line probe, the lower section extending from a point below the passage to a surface of a product in the tank, a propagation field of the transmit signal along the lower section having the first radial extension, returning an electromagnetic return signal resulting from reflection of the electromagnetic transmit signal by the surface, receiving the electromagnetic return signal, and determining the filling level based on a relationship between the transmit signal and the return signal.

The propagating field limiting structure thus serves to locally reduce the radial extension of the propagating filed along the probe, along the section of the probe that extends through the passage, which, as an example, may have a diameter of 1 m or less. The passage is located below the tank roof, in the operating range of the level gauge. As an example, it may be located around 0.5 m or more below the tank roof. In other words, the level gauge is operable to measure a filling level above, as well as below, the passage. The propagation field limiting structure only affects the propagating field along the third section, i.e. the propagating field of the probe is unaffected above as well as below the propagating filed limiting structure.

With this design, the radial extension of the propagating field can be locally reduced so that a sufficient portion of the signal power is allowed to pass through the passage. At the same time, any negative impact of the propagation field limiting structure, such as weaker reflections from the product surface, will be restricted to the thirds section of the probe, where the propagation field limiting structure is arranged. Other sections of the probe will operate as before.

It is noted that field limiting structures are known per se, and have been described initially for impedance matching between a tank feed through and a probe. The field limiting effect of such impedance matching structures has also been found advantageous with respect to nozzles. However, prior art examples have exclusively been arranged in the top of the tank, immediately below the tank feed through. The present invention is significantly different from such prior art, as the present invention suggests a field limiting structure arranged between two "unlimited" sections of the probe.

According to some embodiments, the propagation field limiting structure is adapted to ensure that at least 95% of a power of the transmit signal is transmitted through the passage. In most applications this is sufficient to ensure satisfactory performance.

In some embodiments, the axial extension of the field limiting structure is less than 0.8 m, or less than 0.6 m. By limiting the extension of the propagation filed limiting structure, any negative impact on performance can be reduced.

The third section of the transmission line probe, i.e. the section along which the propagation field limiting structure is arranged, may extends at least 0.25 m above the passage and at least 0.25 m below the passage. By extending a distance on each side of the passage, any interference on the signals is effectively reduced.

BRIEF DESCRIPTION OF THE DRAWINGS

These and other aspects of the present invention will now be described in more detail, with reference to the appended drawings showing example embodiments of the invention.

FIGS. 6a-6c are further examples of propagation field limiting structures according to embodiments of the present invention.

DETAILED DESCRIPTION OF PREFERRED EMBODIMENTS

In the present detailed description, reference is mainly made to filling level determination by means of measuring the time between transmitted and reflected pulses. As is, however, evident to the person skilled in the relevant art, the teachings of the present invention are equally applicable to radar level gauge systems utilizing phase information for determining the filling level through, for example, frequency-modulated continuous wave (FMCW) measurements. When pulses modulated on a carrier are used, phase information can also be utilized.

As discussed above, the present information relates to guided wave radar level gauges, and more specifically such gages with a single wire waveguide (also called transmission line probe). The wave propagation along a single wire waveguide is slightly slower than on a twin-wire if both are without any dielectric material. The single wire is a surface waveguide and outside the wire there is a field with an exponential decay in direction perpendicular to the wire. The degree of exponential decay depends on the material and other surface properties of the wire.

Figure 1:
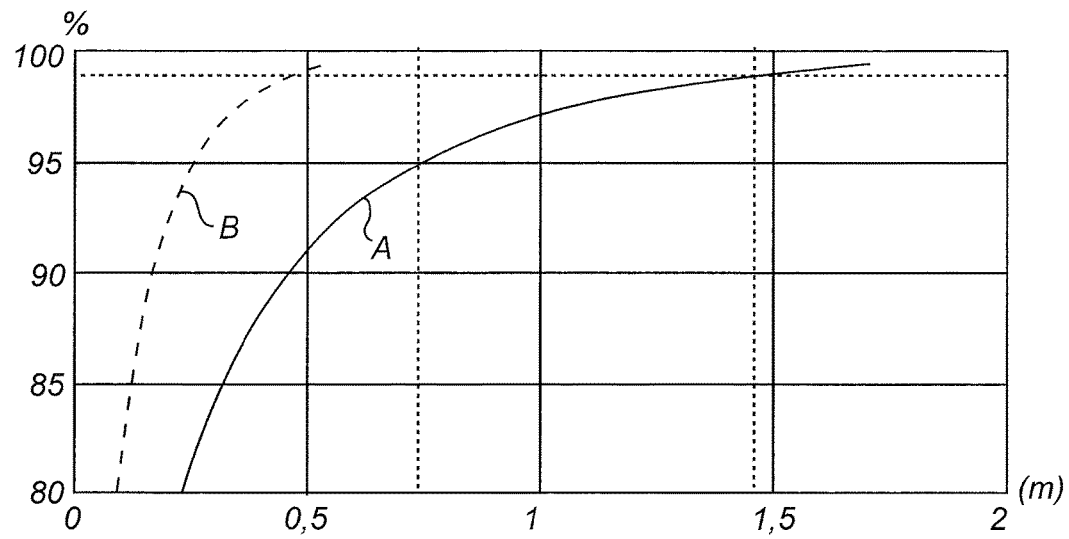
FIG. 1 is a diagram illustrating power loss for a single wire transmission line probe when passing a hole in a conducting structure.

FIG. 1 shows an example of the power distribution (%) as a function of radius (r) around the probe. The first curve A indicates the power distribution for a 4 mm stainless steel naked metal wire (Goubau line), while curve B is the same line but provided with a 0.5 mm PTFE coating. It is clear from the diagram that for a coated probe, 95% of the power is contained within a radius of about 0.25 m, while for a naked probe, 95% of the power is contained within a radius of about 0.7 m. This means that if the naked probe extends through a 1.4 meter diameter opening in a conducting structure, only 95% of the power will pass.

A 95% field diameter is a relevant limit as the structure (in worst case a floor with a hole where the wire is passing) allowing 95% to pass will probably reflect a measurable part of the remaining 5% of the power. A liquid surface will reflect one to a few % of the power so an object letting less than 95% power pass will most probably create some reflection problems in addition to the power loss itself.

A closer look on the electromagnetic field equations reveals that any modification of the wire decreasing the phase velocity (i.e. making the wave propagation slower) will reduce the field around the single wire. A simple example is a thin dielectric layer.

Figure 2:
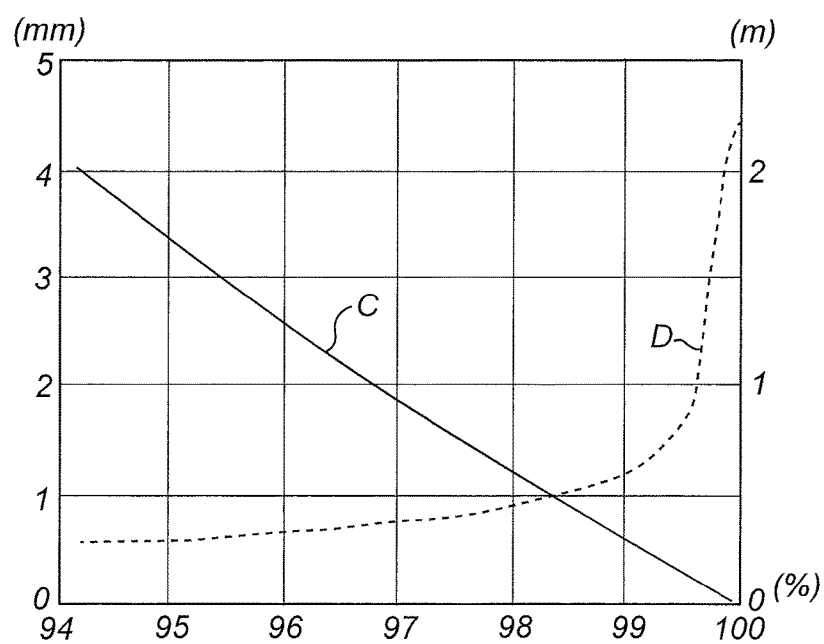
FIG. 2 is a diagram illustrating coating thickness and 95% power density diameter as function of propagation velocity.

This is illustrated in FIG. 2, showing (curve C) the relationship between the phase velocity (x-axis) and PTFE layer thickness (y-axis, left) for a 6 mm wire of stainless steel (poor electrical conductor as compared to copper). FIG. 2 also shows (curve D) the relationship between phase velocity and a 95% power field diameter (y-axis right) (i.e. the diameter within which 95% of the transmitted power is contained). It is clear that the thicker the PTFE layer, the slower the wave propagation and the smaller the diameter of a cylinder along the wire within which 95% of the transmitted power is contained. The diagram above refers to 1 GHz and a thicker wire or higher frequency will both make the field more narrow.

It is clear from the FIG. 2 that the phase velocity should be kept below ~99% of the velocity in vacuum free space propagation in order to allow passage through narrow openings (diameter<1 m) in electrically conducting structures.

Figure 3:
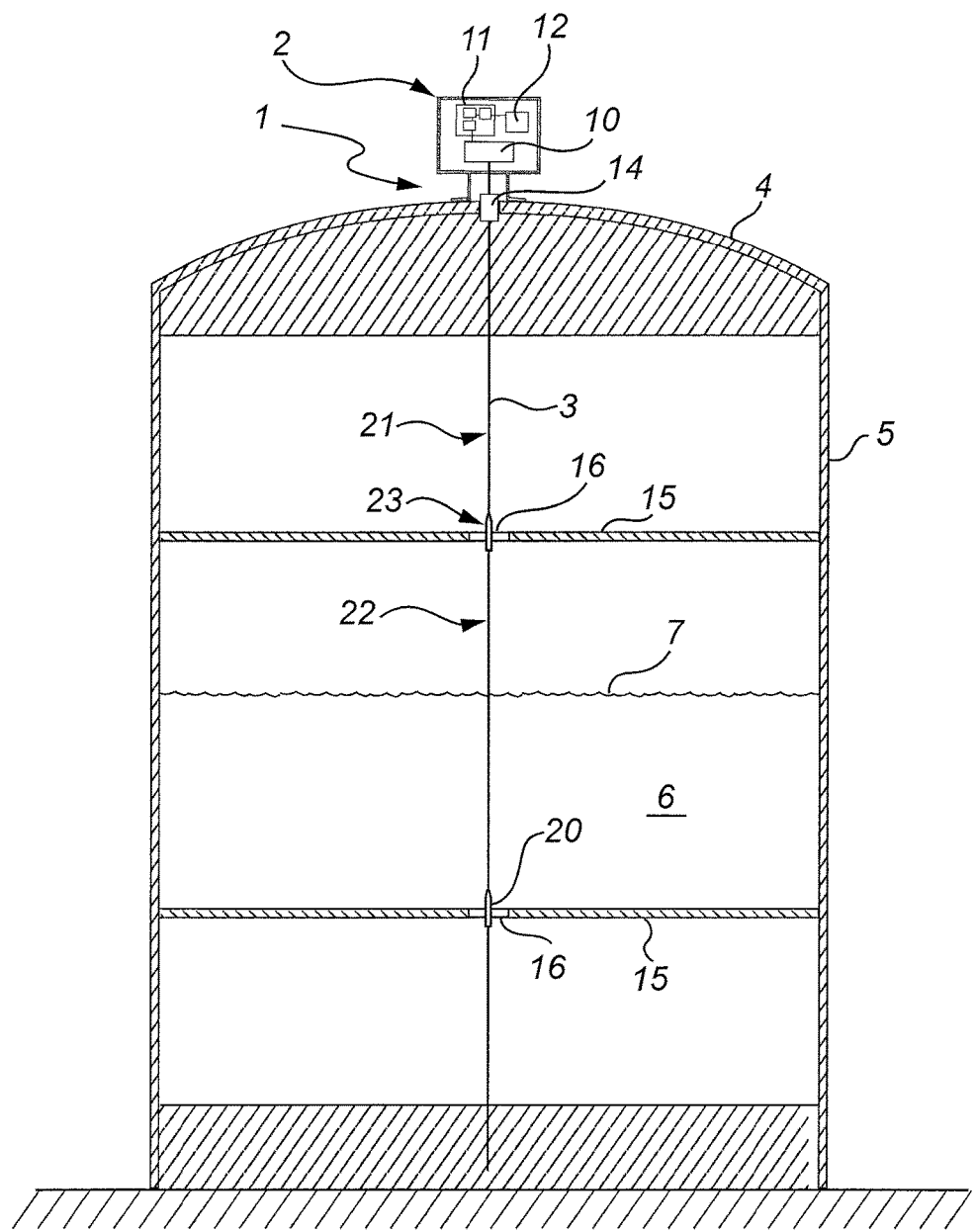
FIG. 3 is a schematic sectional view of a tank arrangement including a guided wave radar level gauge according to an embodiment of the present invention.

FIG. 3 schematically illustrates a radar level gauge system 1 according to an embodiment of the present invention, comprising a measurement electronics unit 2, and a single wire transmission line probe 3. The electronics unit 2 is mounted on the roof 4 of a tank 5, which is partly filled with a product 6 to be gauged. The probe is electrically connected to the unit 2, and extends from the unit 2 to the bottom of the tank (or at least to a position close to the bottom). By guiding a transmitted electromagnetic signal ST towards the surface 7 of the product 6, and analyzing reflected signals SR traveling back from the surface 7, the measurement electronics unit 2 can determine the distance between a reference position (such as the tank ceiling) and the surface 7 of the product 6, whereby the filling level can be deduced. It should be noted that, although a tank 5 containing a single product 6 is discussed herein, the distance to any material interface along the probe can be measured in a similar manner.

As is schematically illustrated in FIG. 3, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5. The processing unit 11 is, furthermore, connectable to external communication lines 13 for analog and/or digital communication via an interface 12. Moreover, although not shown in FIG. 1, the guided wave radar level gauge system 1 is typically connectable to an external power source, or may be powered through the external communication lines 13. Alternatively, the radar level gauge system 1 may be configured to communicate wirelessly. The transceiver 10 is further connected to a tank feed through structure 14, providing a sealed electrical connection to the interior of the tank. The probe 3 is mechanically attached to the feed through structure 14, and electrically connected to the transceiver via the feed through structure.

Figure 4:
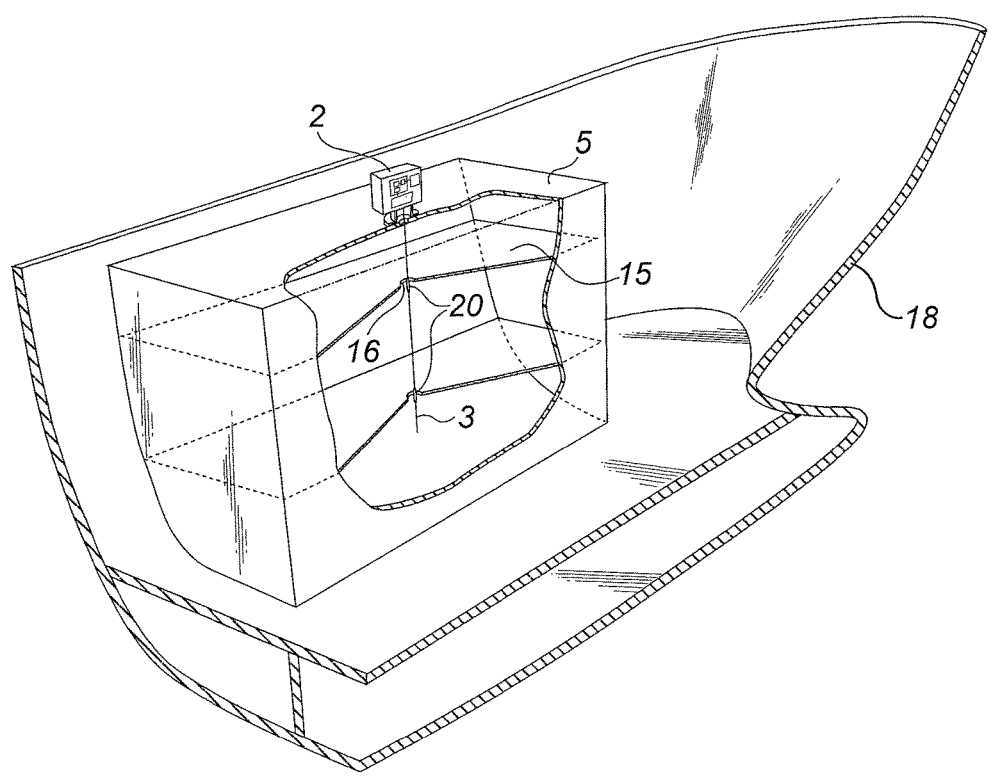
FIG. 4 is a schematic perspective view of a ship comprising a tank arrangement according to an embodiment of the present invention.

As schematically illustrated in FIG. 3, the tank 5 comprises one or several (in the illustrated example two) interior structures 15, made of an electrically conducting material. Typically, but not necessarily, the interior structures are made of metal, e.g. steel or aluminum. The interior structures 15 may be intermediate decks, intended to support an operator entering the tank when it is empty. The structures 15a may also be provided primarily to provide structural strength to the tank. This may be of particular relevance when the tank is located on a moving vessel such as a ship 18, see FIG. 4. The structures are located a distance below the roof 4 of the tank 5, and as an example the upper structure 15a is located about 0.5 m below the roof 4, while the second structure 15b is located about 3 m below the roof.

The probe 3 extends through passages 16 in the structures 15. The passages (e.g. holes) 16 may have a diameter which is less than 1 m, and maybe as small as 0.7 m or even 0.6 m. When RLG signals propagating along a non-coated single wire probe pass though such a small opening in an electrically conducing structure, the signal strength will be significantly attenuated. As an example, for a 4 mm steel wire probe, and an operating frequency in the order of GHz, a signal will lose about 9% of its power when passing a circular opening one meter in diameter, and about 20% of its power when passing a circular opening 0.5 meter in diameter. In many applications a few percent power loss will be detrimental to the performance of the RLG. Further, the lost power will at least partly be reflected by the structure 15, causing interference of the measurement.

For this reason, according to the present invention, a propagation field limiting structure 20 is arranged along those sections of the probe which pass through the passages 16. The propagation field limiting structure is configured such that it reduces the propagation speed along the probe, thereby causing a reduction of the radial extension of the propagating field, i.e. the extension of the propagation field radially out from the probe. As a consequence, for each passage 16, the propagation field will have a first, wider extension along a first, upper section 21 of the probe above the passage, and along a second, lower section 22 of the probe below the passage, and a second, more narrow extension along a third, intermediate section 23 extending through the passage.

The length of the propagation field limiting structure, and thus of the third probe section, should be sufficiently long to avoid interference from the structure 15. At the same time, it should be as short as possible, in order to minimize any negative impact on RLG performance. In some applications, a length in the range 0.5-1 m has been found appropriate. The propagation field limiting structure is typically arranged symmetrically around the passage, such that the propagation field limiting structure extends an equal length above the passage as below the passage.

Figure 5A:
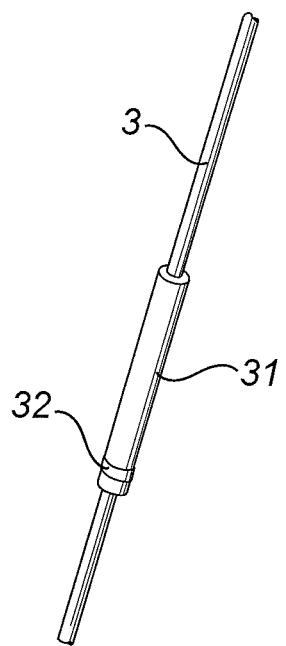
FIGS. 5a and 5b are two examples of propagation field limiting structures according to embodiments of the present invention.

One relatively simple embodiment of a propagation field limiting structure 20, illustrated in FIG. 5a, is a coating or sleeve 31 of a suitable dielectric material, e.g. plastic such as PTFE. As an example, a 0.8 m long tube can be slidably arranged along the probe 3 before suspending the probe in the tank, and then be secured to the probe in the appropriate place by suitable fastening means 32 (e.g. clamp, glue, etc) when the probe has been suspended in the tank.

The sleeve typically has a thickness of only a few mm or less, which provides the required limitation of the radial field (see above). It is noted that if the sleeve 31 is relatively thick, e.g. two millimeters or more, it may be advantageous to provide the sleeve 31 with tapered ends in order to provide impedance matching to adjacent sections of the probe 3. By such impedance matching, any reflection from the sleeve is avoided or at least minimized. Such tapered sections preferably have a longitudinal extension of half a wavelength, which, for a typical operating frequency, corresponds to a few centimeters.

Figure 5B:
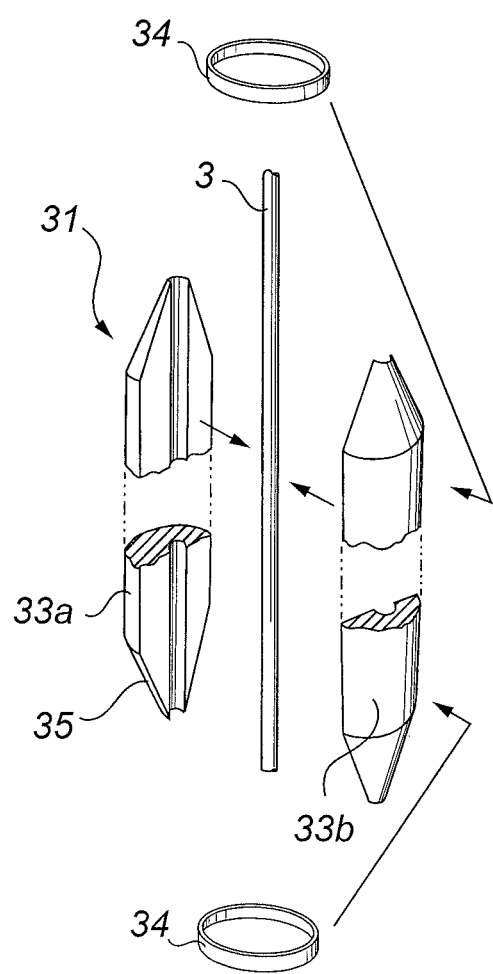

Another example is illustrated in FIG. 5b, in which case the sleeve 31 comprises two semi-cylindrical pieces 33a, 33b which are connectable so as to sandwich the probe 3 there between. The pieces are again of a suitable dielectric material such as plastic, and screws or clamps 34 may be provided to securely press the pieces 33a, 33b against each other. As indicated in FIG. 5b, the pieces 33a, 33b may be tapered in each end 35, thereby matching the structure to the other sections of the probe in order to avoid reflections. The dimensions of the sleeve 31 in FIG. 5b have been exaggerated with respect to the probe 3, but as mentioned above thickness of the sleeve is typically a few mm or less. The length of the sleeve 31 is typically in the range 0.5-1 m, while the tapered ends are only a few centimeters long.

An advantage with the two-part field limiting structure in FIG. 5b is that the structure may be mounted on a probe which has already been suspended in a tank. This allows retro-fitting the field limiting structure, thus improving the performance of an already existing system.

As noted above, the radial field extension is determined by the propagation speed along the probe. FIG. 6a-6c provides some examples of other designs which serve to reduce the propagation speed.

In FIGS. 6a and 6b, the propagation field limiting structure 20 includes a twisted portion 41 of the transmission line probe 3 around its longitudinal axis. FIG. 6a shows the case of two twisted wires 42 while FIG. 6b shows the case of a twisted ribbon 43. Along the twisted portions the propagating signal will experience a longer path, thereby causing a reduction of the propagation speed in the longitudinal direction of the probe. Yet another option having similar effect is illustrated in FIG. 6c, showing a ribbon type probe 44 with suitably shaped cut-outs 45. The resulting shape of the probe will cause the propagating field to travel back and forth across the ribbon 44, again leading to a reduction of the propagation speed in the longitudinal direction of the probe.

Figure 7:
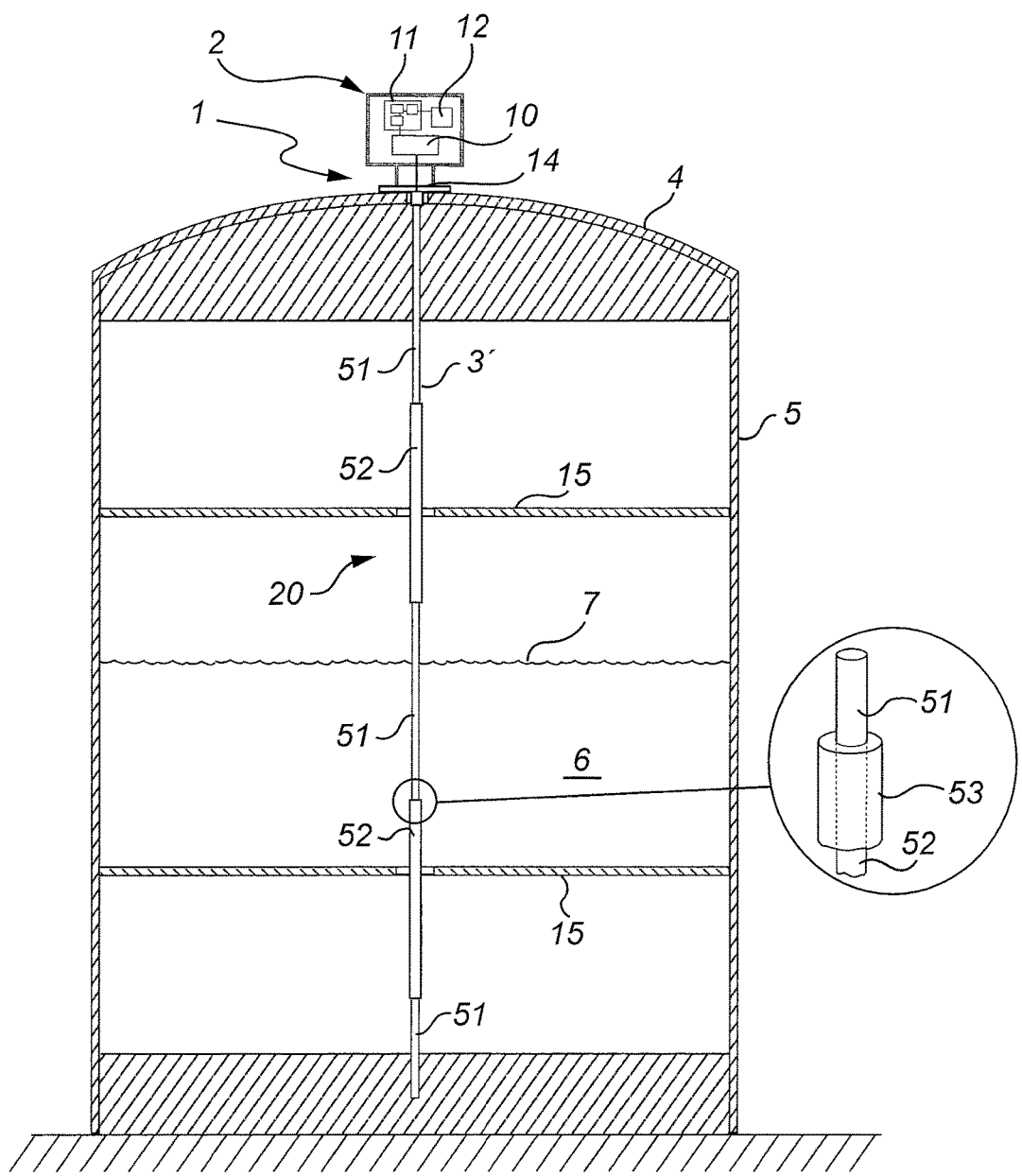
FIG. 7 is a schematic view of a sectional probe for a tank arrangement according to an embodiment of the present invention.

FIG. 7 shows a further embodiment of the present invention. Elements of similar or identical structure and function have the same reference numerals as in FIG. 2, and will not be further described here. In this case, the probe 3' consists of a set of discrete sections 51, 52. Such probes are known per se, and examples include probes having sections that are completely detachable from each other, as well as so called foldable probes, having sections which may be folded with respect to each other.

In the probe in FIG. 7, two sections 52 are different from the other sections 51, and forms a propagation field limiting structure 20. In the example in FIG. 6, the sections 52 have been provided with a dielectric coating 53. The thickness of the coating has been exaggerated in FIG. 7, and is typically only a few mm or less. If the thickness is several mm, then the ends are preferably tapered as discussed above.

Obviously, depending on the length of the probe sections 51, 52, and the required length of the propagation field limiting structure 20, several adjacent sections 51 may be combined to form the propagation field limiting structure 20. For example, in the present example, several adjacent PTFE-coated sections 51 may form the propagation field limiting structure 20.

The person skilled in the art realizes that the present invention by no means is limited to the preferred embodiments described above. On the contrary, many modifications and variations are possible within the scope of the appended claims. For example, other dimensions and materials may be used in the single wire probes. Further, the propagation field limiting structures may have other size and form, as long as the described effect is achieved.

What is claimed is:

1. A tank arrangement including:
   a tank including a tank roof and a passage surrounded by an electrically conducting structure, said passage being located at a level below the tank roof and having a passage cross section which is smaller than a tank cross section at said level;
   a guided wave radar level gauge installed in the tank for determination of a filling level of a product contained in the tank, the guided wave radar level gauge including:
      transceiver circuitry for generating and transmitting an electromagnetic transmit signal in an operating frequency range, and receiving an electromagnetic return signal,
      a single wire transmission line probe connected to the transceiver circuitry and extending into the tank through a tank entry and configured to guide the electromagnetic transmit signal from said transceiver circuitry to a surface of the product and to return an electromagnetic return signal resulting from reflection of the electromagnetic transmit signal by the surface,
      processing circuitry connected to the transceiver and configured to determine the filling level based on a relationship between the transmit signal and the return signal,
      wherein the single wire transmission line probe includes a first section connected to said tank entry and extending a distance from said tank entry to a point located above said passage, a second section located completely below said passage, and a third section connecting said first and second sections with each other and extending through said passage,
      wherein a propagation field of an electromagnetic signal in the operating frequency range propagating along the first and second section has a first 95% power field diameter; and
      a propagation field limiting structure arranged along the third section of the transmission line probe,
   said propagation field limiting structure being adapted to cause a propagation field of an electromagnetic signal in the operating frequency range propagating along the third section of the probe to have a second 95% power field diameter, wherein said second 95% power field diameter is smaller than the first 95% power field diameter.

2. The tank arrangement according to claim 1, wherein the second 95% power field diameter is smaller than said passage cross section.

3. The tank arrangement according to claim 1, wherein an axial extension of the field limiting structure is less than 0.8 m.

4. The tank arrangement according to claim 3, wherein an axial extension of the field limiting structure is less than 0.6 m.

5. The tank arrangement according to claim 1, wherein the third section of the transmission line probe extends at least 0.25 m above the passage and at least 0.25 m below the passage.

6. The tank arrangement according to claim 1, wherein the passage cross section is less than 1 m wide.

7. The tank arrangement according to claim 6, wherein the passage cross section is less than 0.7 m wide.

8. The tank arrangement according to claim 1, wherein the propagation field limiting structure comprises a sleeve of dielectric material arranged around the third section of the transmission line probe.

9. The tank arrangement according to claim 8, wherein a thickness of the sleeve is less than 3 millimeters.

10. The tank arrangement according to claim 9, wherein a thickness of the sleeve is less than 1 millimeter.

11. The tank arrangement according to claim 8, wherein ends of the sleeve are tapered in order to provide impedance matching with said first and second probe sections.

12. The tank arrangement according to claim 8, wherein the sleeve is formed by two pieces which are connectable so as to sandwich the probe.

13. The tank arrangement according to claim 1, wherein the propagation field limiting structure comprises a suitably shaped metal ribbon attached to the transmission line probe.

14. The tank arrangement according to claim 1, wherein the propagation field limiting structure comprises a portion of the transmission line probe which has been twisted around its longitudinal axis.

15. The tank arrangement according to claim 1, wherein the transmission line probe is comprised of a plurality of discrete sections.

16. The tank arrangement according to claim 15, wherein the third section is formed in its entirety by one of said discrete sections.

17. The tank arrangement according to claim 1, wherein the passage is located at least 0.5 meter below the tank roof.

18. The tank arrangement according to claim 1, arranged on a ship.

19. A method for determination of a filling level of a product contained in the tank, said tank including a tank roof and a passage surrounded by an electrically conducting structure, said passage being located at a level below the tank roof and having a passage cross section which is smaller than a tank cross section at said level, said method comprising:

generating and transmitting an electromagnetic transmit signal in an operating frequency range;

guiding said transmit signal along an upper section of a single wire transmission line probe, said first section being connected to a tank entry and extending a distance from said tank entry to a point located above said passage, a propagation field of the transmit signal along the upper section having a first 95% power field diameter;

guiding said transmit signal along an intermediate section of the single wire transmission line probe, said intermediate section extending through said passage;

reducing the propagation velocity along the intermediate section, such that a propagation field of the transmit signal along the intermediate section has a second 95% power field diameter, wherein said second 95% power field diameter is smaller than the first 95% power field diameter;

guiding said transmit signal along a lower section of the single wire transmission line probe, said lower section extending from a point below said passage to a surface of a product in the tank, a propagation field of the transmit signal along the lower section having the first 95% power field diameter;

returning an electromagnetic return signal resulting from reflection of the electromagnetic transmit signal by the surface;

receiving the electromagnetic return signal; and determining the filling level based on a relationship between the transmit signal and the return signal.

20. The method according to claim 19, further comprising arranging a sleeve of dielectric material around the intermediate section of the transmission line probe.

21. The method according to claim 19, further comprising matching the impedance of the intermediate section with the impedance of the upper and lower sections.

* * * * *